United States Patent [19]

Toyama et al.

[11] 4,231,169
[45] Nov. 4, 1980

[54] INSOLE AND METHOD OF PRODUCING THE SAME

[75] Inventors: Takashi Toyama, Koganei; Yasuo Kogo, Shizuoka, both of Japan

[73] Assignee: Toho Beslon Co., Ltd., Tokyo, Japan

[21] Appl. No.: 917,769

[22] Filed: Jun. 21, 1978

[30] Foreign Application Priority Data

Jun. 21, 1977 [JP] Japan ............................ 52-80582[U]
Jan. 7, 1978 [JP] Japan .................................... 53-655

[51] Int. Cl.² .......................................... A43B 13/41
[52] U.S. Cl. ........................................ 36/43; 36/44;
36/76 C; 12/146 S; 428/408
[58] Field of Search .......................... 36/44, 43, 76 C;
12/146 S; 428/408; 139/157

[56] References Cited
U.S. PATENT DOCUMENTS

| 2,173,968 | 9/1939 | King | 36/76 C |
| 2,232,767 | 2/1941 | Brophy | 36/76 C |
| 2,644,250 | 7/1953 | Ciaio | 36/44 X |
| 3,573,086 | 3/1971 | Lambdin, Jr. | 428/408 X |
| 3,826,155 | 7/1974 | Muller | 139/157 |
| 4,023,801 | 5/1977 | Van Auken | 428/408 X |

FOREIGN PATENT DOCUMENTS 2314963 9/1973 Fed. Rep. of Germany ............. 36/43

Primary Examiner—James Kee Chi
Attorney, Agent, or Firm—Sughrue, Rothwell, Mion, Zinn and Macpeak

[57] ABSTRACT

A light insole, with a high modulus of elasticity, which has a shank comprising a fiber-reinforced resin sheet and which is produced by putting a shank element on an insole element and heating under pressure to mold the sheet and adhere the sheet to the insole element.

21 Claims, 7 Drawing Figures

INSOLE AND METHOD OF PRODUCING THE SAME

BACKGROUND OF THE INVENTION

1. Field of the Invention

The present invention relates to an insole having a shank comprising a fiber-reinforced resin sheet and a method of producing the same.

2. Description of the Prior Art

The shank put on the insole of a shoe maintains the shape of the shoe and functions as a spring during walking. The shank has an important influence upon the properties and durability of the shoes. Properties required for a shank are as follows.

(1) The shank should have a suitable bending rigidity.

(2) The shank should have a high destruction strength.

(3) The original state of the shank should be immediately restored if the shank is bent, and then released.

(4) The shank should be light in weight.

Generally, an insole element (this term being used to describe an insole before a shank has been put thereon), especially the rear half comprising the heel-nontread part-tread part, comprising press-board, wood, nonwoven cloth, cloth or leather impregnated with a binder has been molded with hardening by heat so as to form a curved surface which coincides with the shape of a shoe. Then, the rear-half of this insole element and a shank are fixed together to produce an insole.

Hitherto, iron or steel has been mainly used as raw materials for a shank. A shank made from iron or steel is difficult to comform to the curvature of a shoe last, and a two-step process which comprising preparing each of the shank and the insole element separately and unifying them has been employed. Therefore, it is very difficult to mold so that the face of the heel-nontread part-tread part of the insole element and the face of the shank have each the same curvature.

SUMMARY OF THE INVENTION

An object of the present invention is to provide a novel insole.

Another object of the present invention is to provide an insole having a light shank with a high modulus of elasticity.

A further object of the present invention is to provide a method of producing the above-mentioned insole.

The present invention provides an insole having a shank which comprises a fiber-reinforced resin sheet. The insole of the present invention is preferably produced by putting a shank element comprising a fiber-resin composite sheet on an insole element and heating under pressure to mold the sheet and adhere the sheet to the insole element.

BRIEF DESCRIPTION OF THE ACCOMPANYING DRAWINGS

DETAILED DESCRIPTION OF THE INVENTION

Figure 1:
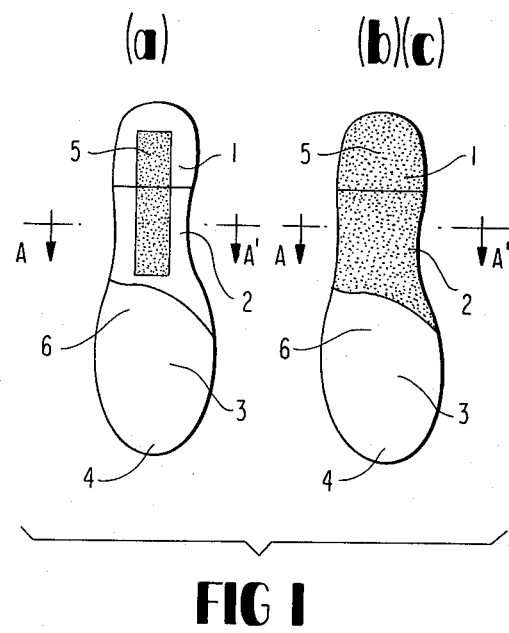
FIG. 1 is a ground-plane of an insole of the present invention.
Figure 2:
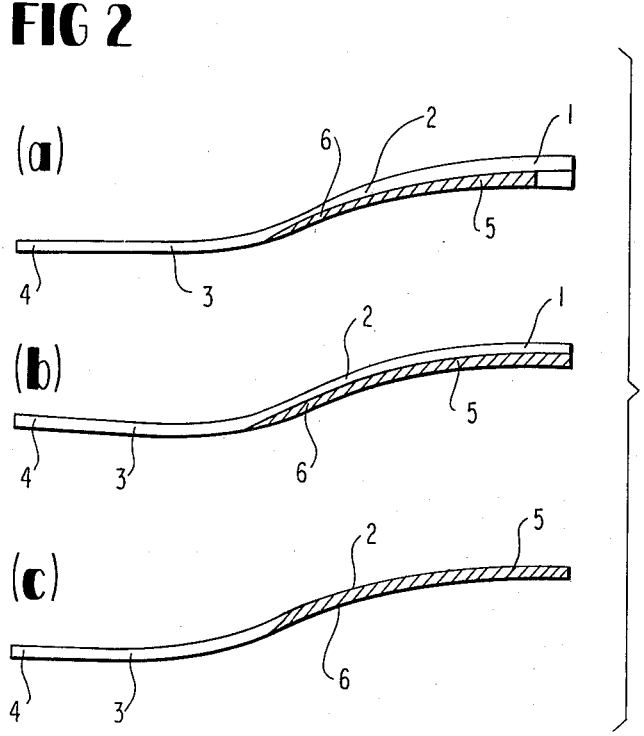
FIG. 2 is a longitudinal section of the insole shown in FIG. 1.
Figure 6:
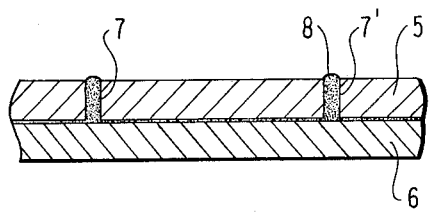

The present invention will be explained by reference to the drawings. In FIGS. 1 and 2, 6 is an insole element, 1 is a heel part, 2 is a non-tread part, 3 is a tread part and 4 is a toe part. Usually a shank 5 is put on the heel part 1, the non-tread part 2 and the tread part 3.

Figure 3:
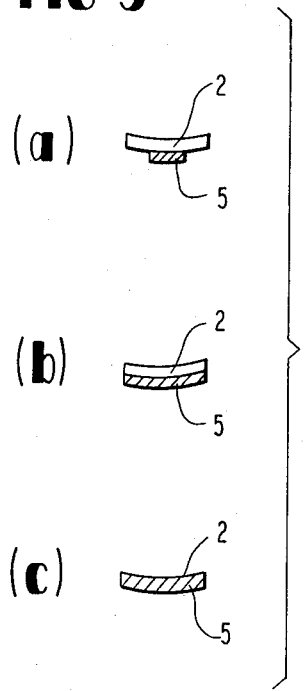
FIG. 3 is a transverse section of the insole shown in FIG. 1 taken along the line A—A'.

In each drawing, (a) shows a long strip-shaped shank being used, (b) shows a shank put on the entire rear-half of an insole element including the heel and (c) shows the rear-half of the insole including the heel formed integrally with a fiber reinforced resin and the front part including the tread part directly bonded thereto. The section along the line A—A' in FIG. 1 is shown as FIG. 3.

Insole elements which are used conventionally can be used in the present invention. For examples, press-board, crushed wood, nonwoven cloth, or pieces of leather can be used as raw materials and a binder, such as polyvinyl alcohol, polyvinyl acetate, glue, etc., is impregnated therein to form an insole element.

Fibers in the fiber-reinforced resin which can be used in the present invention are those which have a high specific modulus of elasticity, e.g., about $6 \times 10^9$ mm or higher, and a high specific strength, e.g., about $5 \times 10^7$ mm or higher.

For example, inorganic fibers such as carbon fibers (including graphite fibers), glass fibers, aluminum oxide fibers, silicon carbide fibers, or boron fibers, etc., metal fibers such as stainless steel fibers, etc., and organic fibers having high specific modulus of elasticity such as fibers of an aromatic polyamide obtained by the condensation of p-phenylenediamine with terephthalic acid or the condensation of p-aminobenzoic acid, etc., can be used. Carbon fibers which are usually obtained from rayon or polyacrylonitrile fibers as raw materials are preferred for use in the shank element because they have a high specific modulus of elasticity (about $13.7 \times 10^9$ mm) and a high specific strength (about $171 \times 10^6$ mm). Although glass fibers have an inferior specific modulus of elasticity in comparison with carbon fibers, glass fibers are preferred for use together with materials having excellent characteristics such as carbon fibers. Other fibers can also be used as a combination of two or more types thereof. Such a combination preferably contains more than about 10% by volume of carbon fibers, and it is preferably for the fibers other than carbon fibers to be sandwiched between carbon fibers in a fiber-reinforced resin.

A suitable diameter for the fiber filaments used is generally about 1 to 100μ.

Cloth, nonwoven cloth, a mat or a bundle of fibers oriented (arranged) in one direction obtained from these fibers can be used as the reinforcing material. Further, where a fiber mat or a nonwoven cloth is used as the reinforcing fibers, a suitable fiber length is about 2 to 150 mm, preferably longer than 10 mm and where a woven cloth or fiber bundle is used, continuous filaments are employed. Longer fibers are preferred.

A thermosetting resin or thermoplastic resin is used as the resin matrix of the fiber-reinforced resin. Suitable thermosetting resins which can be used include, for example, epoxy resins (such as a bisphenol A type epoxy resin, a resin produced by reacting a novolak resin such as a phenol-novolak resin or a cresol-novolak resin with epichlorohydrin, etc.), unsaturated polyester resins (such as an isophthalic acid type resin, an orthophthalic acid type resin with the glycol component of these polyesters being ethylene glycol, propylene glycol, diethylene glycol, dipropylene glycol, triethylene glycol, butandiol, etc.), or phenol resins (such as, a resole type resin, a novolak type resin, etc.), vinyl ester resins (such as a novolak type resin obtained by reacting a compound or a resin having epoxy groups in the chemical structure thereof with a carboxylic acid having a vinyl group, e.g., as described in U.S. Pat. No. 3,006,112, etc.), polyimides (such as a polyimide obtained by a condensation reaction of, for example, pyromellitic di-anhydride with 4,4'-diaminodiphenylether, or polyimides obtained by an addition polymerization of, for example, bis-maleimide, 4,4'-diaminodiphenylmethane, 4,4'-diaminodiphenylether, or 1,4-phenylenediamine, etc.) and suitable thermoplastic resins which can be used include, for example, polyamides (e.g., nylon), polyacetals, polysulfones, polycarbonates, polyethylene, polyvinylidenechloride, etc.

The fiber resin composite sheet produced using these resins as a resin matrix can be produced using known conventional methods. For example, a fiber bundle oriented in one direction, cloth, a nonwoven sheet or a mat can be dipped into a molten resin or a solution of a resin to impregnate the fiber bundle with the resin. Suitable methods are disclosed in detail, for example, in British Pat. No. 1,319,275, French Patent Application No. 2,067,053, Japanese Patent Applications (OPI) Nos. 105772/75 and 126260/76. When the sheet is heated under pressure a fiber reinforced resin can be obtained. Further, a fiber-resin composite sheet comprising a fiber bundle, cloth, a nonwoven cloth or a mat which is a mixed composite of reinforcing fibers and fibers composed of a thermoplastic resin having a lower melting point than that of the above-described fibers can be used. When the sheet is heated under pressure to melt the thermoplastic resin and then the thermoplastic resin is hardened by cooling, a fiber-reinforced resin having a resin matrix composed of the thermoplastic resin can be produced. This method is described in Japanese Patent Application No. 148561/76 (corresponding to U.S. Patent Application Ser. No. 859,634 filed Dec. 12, 1977). A thermosetting resin can also be used instead of the thermoplastic resin in the above-described composite. In this case the fluidizing point or the melting point of the resin should be lower than the melting point of the reinforcing fiber.

The thus-produced fiber reinforced-resin composite sheet can be used as the shank element in the present invention.

The volume ratio of the fibers in the fiber-reinforced resin composite is generally about 30 to about 85% by volume. If the ratio of the fibers is lower than about 30% by volume, the shank has insufficient modulus of elasticity. If the ratio of the fibers is more than about 85% by volume, the shank has insufficient destruction strength. A preferred amount of the fibers is 50 to 75% by volume. Further, the bending modulus and bending strength are particularly excellent, when the amount of the fibers is about 65 to 75% by volume where the fibers are oriented in one direction and when the amount of the fibers is about 50 to 65% by volume in a case of a cloth.

If the fibers are used as a mat or a nonwoven sheet thereof, the shank element becomes bulky and has an inferior molding property and consequently it is difficult to obtain excellent characteristics. On the contrary, if the fibers are used as a cloth or a bundle of oriented fibers, the molding properties are excellent and excellent characteristics are easily obtained. An object of reinforcing the insole with the shank is to provide high rigidity and high strength to the insole in the lengthwise direction. Accordingly, it is most effective for the fibers in the resin to be a cloth, particularly, a satin weave cloth, or to be oriented in one direction.

The shank used in the present invention preferably has about 20 to about 80 fibers in the thickness direction. Although the thickness of the shank put on the insole depends upon the ratio of the fibers to the resin, the thickness is generally more than about 0.14 mm. Most generally, the thickness is about 0.28 to about 0.64 mm. The thickness may be greater than about 0.64 mm but this is not necessary for the purpose of the shank.

Although a long strip shank is generally used, the shape of the shank can be appropriately selected, such as an ellipse shape, the same shape as the rear-half of the insole including the heel, and the like. The size of the shank may be nearly the same as that conventionally used, namely, a size of 15 mm (in width) × 100 mm (in length) can be employed in cases of using a monoaxially oriented carbon fiber-reinforced resin containing fibers in an amount of 150 g/m² as the shank of shoes for men, but the size can be appropriately varied, of course, depending on the shape of the shoes and the properties required therein.

One or two shanks may be provided on one side or both sides of the insole element respectively. The number of the sheets used can be decided so as to obtain the necessary rigidity. In using two shanks, a higher rigidity can be obtained by applying one shank to each side of the insole than can be obtained by applying both shanks to one side of the insole. Further, the shank may be composed of two or more, preferably up to 5, sheets of the shank element. Generally, the total thickness of the shank is within the range of about 0.28 mm to about 0.64 mm.

The weight of the shank of the present invention necessary to obtain the same rigidity as that of a shank composed of steel is about 1/10 to 1/5 of that of the steel. Further, in prior art shanks compsed of iron or steel, since they have a thickness of about 1 mm, unevenness occurs on the insole when they are applied to the insole element, and it becomes necessary to insert an insert between the insole and the sole in order to remove this unevenness. However, in using the shank of the present invention, such an insert is rarely required, because of the thin thickness.

Further, adhesion of the shank element to the insole element may be carried out using any conventional method. Such methods include (1) a method which comprises separately molding a cut shank element and a cut insole element (so as to form a curvature) and then superposing and bonding the two elements together, (2) a method which comprises molding an insole element by previously putting a shank element on the insole element and molding the shank element simultaneously with the bonding of the shank element to the insole element, (3) and a method which comprises piling up both elements which do not have any curvature, and molding them simultaneously with bonding. The methods are preferably carried out using an apparatus which is capable of heating and applying a pressure at the same time, such as a hot-press or an autoclave, etc. Further, a vacuum bag method can also be used. Method (1) is preferred when the resin in the shank element is a thermoplastic resin.

In order to achieve the adhesion, adhesives are used, if necessary. For example, adhesives are used where the viscosity of the thermosetting resin is too high that the insole base material cannot be impregnated therewith or the content of the thermosetting resin in the shank element is not enough to adhere the shank element to an insole element or when a thermoplastic resin is used as a matrix resin in the fiber-resin composite.

Suitable adhesives should have a good adhesive property to the matrix resin, should not hinder the molding of the matrix resin, should be capable of being used at a low temperature and preferably below 120° C. so that the insole element is not adversely influenced on heating, and should have good properties for impregnating the insole element. Therefore, adhesive materials which are the same type as the material of the matrix resin and have a low viscosity are preferred. Examples of such adhesives include solutions of resins as described hereinbefore, e.g., of an epoxy resin, a phenol resin, etc. The preferred viscosity of the solutions are about 10 centipoise to 10 poise. A thermosetting resin having a low viscosity can be used as it is, that is, it can be used without a solvent.

Where the rear-half including the heel of the insole of the present invention is formed with a fiber reinforced resin, the same three methods (1) to (3) as described hereinbefore can be employed.

The following two methods have now been developed in order to improve adhesion of the shank to the insole base material. (1) Two or more openings are formed on the insole element and the holes are filled with an adhesive so that the adhesive passes through to the back of the insole (reverse side to the face having the shank).

Figure 4:
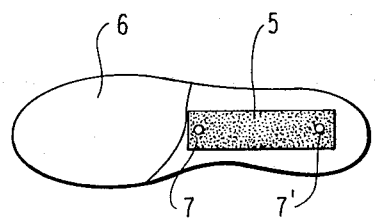
FIG. 4 is a ground-plane of an insole having openings at the insole element.
Figure 5:
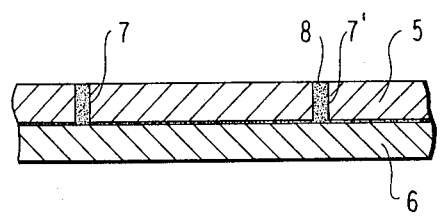
FIGS. 5 and 6 are each a longitudinal section of the insole element shown in FIG. 4.
Figure 7:
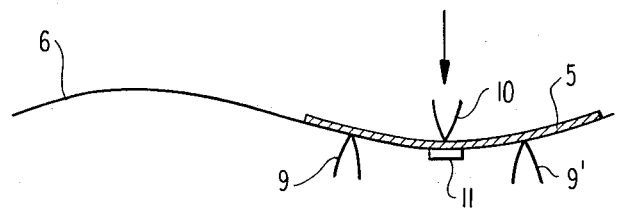
FIG. 7 is a longitudinal section of an insole and a part of a testing apparatus for testing the strain of the insole.

FIG. 4 is a ground-plane of an insole of this invention, wherein 5 and 6 each are as described in FIG. 1 and 7 and 7' are each an opening. FIGS. 5 and 6 are each a partial longitudinal section of the insole shown in FIG. 4, wherein 8 is an adhesive. The adhesive in the openings after it has been solidified is very effective in firmly fixing the shank to the insole element as in the case of riveting. As shown in FIG. 6, if the adhesive is applied so that it overflows on the outer parts of the opening, the fixing effect can be further improved. Many openings or holes having a size of a pinhole or so may be employed or at least one opening and usually 2 to 50 openings, each having a diameter of about 0.3 to about 2 mm, may be employed. (2) When a shank element is adhered to the insole element with an adhesive, a wider area than that of the shank is impregnated with the adhesive. According to this method, separation of the shank by the adhered part of the insole element from the insole element can be prevented. Although the larger the area impregnated is, the larger the effect is, it is advantageous in cutting the edges for the edges of the insole element be be such that a space of about 5 to 15 mm in width is not impregnated. In general, the impregnation is preferably carried out such that a space of about 5 to 10 mm (in width) wider than the shank is impregnated. Although the insole element may be impregnated with the adhesive completely in the thickness direction of the insole element, generally impregnation up to about ½ of the thickness is employed in practice.

In producing the insole of the present invention, if the shank element is adhered to the insole element using one of the above described methods (1) to (3), problems occur because the hardening of the matrix resin in the fiber-resin composite requires a long time, a definite temperature should be maintained until the molding of the resin is completed, and various kinds of molds should be used, because the kind and the size of shoes are different.

As a result of studies on eliminating the problems described above, a method of producing an insole has now been found which comprises piling up a plurality of composites (preliminary insoles) which is formed by putting at least one unmolded shank element on one side or both sides of the insole element molded so as to coincide with the shape of the shoe or unmolded, and heating them under pressure to unify both elements. This method is preferred when the resin in the shank element is a thermosetting resin because the resin can be hardened and molded at a temperature lower than about 120° C.

In applying the shank element to the insole element, a preliminary insole is preferably made by applying, if necessary, an adhesive. In piling up a plurality of these preliminary insoles, a releasing material is preferably used between the preliminary insoles. The superposed preliminary insoles are heated under pressure to mold the shank element or the shank element and the insole element, by which the shank element and the insole element are adhered and unified to form the insole.

When the insole is produced according to this method, many insoles having the same size and shape can be produced at the same time, and various problems caused by inefficient use of the mold in prior methods can be eliminated.

The superposed preliminary insoles having the same size and shape are heated e.g., at a temperature of about 20° C. or higher, under pressure in a heating furnace to mold them. A suitable temperature is generally about 120° C. or less, when a thermosetting resin is used in the shank element. A suitable heating temperature when a thermoplastic resin is used is the softening temperature. Although the temperature used depends on the heat resistance of the insole element, a suitable pressure is about 0.5 to 7 kg/cm² where the matrix resin is a thermosetting resin. When the matrix resin is a thermoplastic resin a suitable pressure is about 10 to 200 kg/cm², usually 30 to 100 kg/cm². When an unmolded insole is used, a much larger pressure is necessary. Further, a suitable molding time is about 90 to 120 minutes if the temperature is 120° C. Releasing materials such as releasing paper (e.g., a paper treated with polyethylene or clay and coated with a silicone resin), films such as a vinyl fluoride type resin film or silicone rubber type resin film, etc. is preferably inserted between the preliminary insoles so that the preliminary insoles do not adhere to each other during the hardening reaction. Further, if a cloth, such as a nylon cloth, is piled up so as to cover the spread adhesive and then a releasing paper, etc. is put thereon, variation in application and disturbance of the orientation of the fibers in the shank element can be prevented. The preliminary insoles superposed are pressed at both sides using a mold so that they are not deformed during the molding of the resin. The number of the preliminary insoles superposed is preferably up to 10 pieces, since, if the number is too large, a uniform heat treatment becomes difficult to carry out. However, if metal sheets such as aluminum or stainless steel having a thickness of 1.5 to 3 mm and the same curvature as that of the insole and coated with a silicone type releasing agent are inserted between every 5 to 10 pieces of the releasing material, a large number of preliminary insoles, namely about 30 preliminary insoles, can be processed in a superposed state, because the metal sheets have excellent heat conductivity and prevent deformation. According to this method, insoles can be effectively produced.

The following examples are given to illustrate the present invention in greater detail. In the examples the reinforcing effect was measured as follows.

In the insoles, it is important for the insole to have a high destruction strength and a high bending rigidity. A 3-point bending test was carried out using an Instron universal tester. The destruction strength was measured as the weight at which the insole was destroyed. The bending rigidity was measured by sticking a strain gauge onto the insole, applying a definite load, and measuring the strain.

In FIG. 7, 6 is an insole element, 5 is a shank, 9 and 9' are each a fulcrum, 10 is a press strip and 11 is a strain gauge. The distance between 9 and 9' was 80 mm. The speed with which the load was applied onto the press strip is 2 mm/min. The press strip was provided so that the pressure of the press strip was applied to the center between both fulcra. In the examples, the strain is represented by the microstrain.

The bending rigidity and the strain are related as follows.

$$D = EI$$

$$E = \sigma/\epsilon$$

wherein
D = Bending rigidity
E = Modulus (of elasticity)
I = Moment of inertia of area (in the materials having the same shape and the same size, the section secondary moment is the same)
$\sigma$ = Stress corresponding to the load for measuring the strain
$\epsilon$ = Strain at a definite load.

$$D = (\sigma/\epsilon)I$$

This case shows that $\sigma I$ is definite and the bending rigidity becomes large if $\epsilon$ becomes small. Further, the fact that the strain is small when the same load is applied under the same condition means that the bending rigidity is large.

EXAMPLE 1

A shank element having a thickness of 0.3 mm and a resin content of 55 weight % was produced by impregnating a cloth of carbon fiber bundles composed of 3000 monofilaments, each with a diameter of 7$\mu$, with a bisphenol A type epoxy resin. Two sheets of the shank element were cut so as to coincide with the rear-half of an insole and put on the rear-half strip of a molded insole element composed of press board impregnated with polyvinyl acetate. The assembly was molded by heating at 130° C. for 60 minutes in an autoclave. The molding pressure in this case was 5 kg/cm².

The resulting shank on the rear-half strip of the insole had a thickness of 0.4 mm.

Strain was determined by applying a load concentrated at one point to thus obtained rear-half part of the insole reinforced with the carbon fiber-reinforced resin [15 mm (width)×100 mm (length)] and to a conventional steel shank [15 mm (width)×100 mm (length)×1 mm (thickness)]. The results obtained are shown in Table 1 below.

Table 1

| Reinforcing Material | Load Concentrated at One Point (kg) | Strain ($\mu$s) |
|---|---|---|
| Carbon Fiber Reinforced Resin | 10 | 292 |
| Carbon Fiber Reinforced Resin | 20 | 665 |
| Steel | 10 | 1474 |
| Steel | 20 | 3253 |

Strain of Reinforced Rear-Half Part of Insole

The results in Table 1 above show that the deformation of the rear-half part reinforced with the carbon fiber-reinforced resin is about 1/5 the deformation which occurred as compared with the conventional shank.

EXAMPLE 2

A shank element having a resin content of 40 weight was produced by impregnating 6000 monoaxially oriented carbon fibers, each having a filament of 7$\mu$, with a bisphenol A type epoxy resin. The shank element was cut into a size of 15 mm×100 mm, and 3 pieces of the shank elements were piled up. Then, a bisphenol A type eopxy resin adhesive was dissolved in acetone to have a viscosity of 1 poise or so. The adhesive was applied to the insole element (composed of press board impregnated with polyvinyl acetate) to impregnate the insole element in an amount of 0.3 g/cm² and 7 mm wider in each direction than the shank application face. Then a previously prepared laminate of the shank element was preliminary applied thereto. Nylon cloth was put on the surface of the shank element so as to cover the area where the adhesive was applied, and then a vinyl fluoride type resin film having a thickness of 0.03 mm was put thereon. 10 pieces of the thus resulting preliminary insole were piled up. Both sides were pressed with a pressure of 1 kg/cm² so that deformation did not occur and then heated for 4 hours in a heating furnace at 110° C. to harden the resin.

After cooling, the pressure was released and the releasing film and the nylon cloth were removed. No disturbance in the fibers of the shank element of the resulting insole occurred and good adhesion was obtained. The thickness of the shank was 0.5 mm.

Strain was measured by applying a load concentrated at one point to thus resulting insole with the carbon fiber-reinforced composite shank and to a conventional insole with a steel shank of the same size. The results obtained were as follows. Further, the insoles of the present invention had good quality.

Table 2

| | Shank | | Load (kg) | Strain ($\mu$s) |
| | Weight (g) | Thickness (mm) | | |
|---|---|---|---|---|
| Present Invention | 1.2 | 0.5 | 10 | 1520 |
| | | | 20 | 3530 |
| Comparison | 10.5 | 1.0 | 10 | 1450 |
| | | | 20 | 3250 |

It can be understood from the above described results that when the shank of the present invention is used, the weight is very light, the thickness is very small, and nearly the same characteristics as those of the conventional steel shank are obtained.

EXAMPLE 3

A test was carried out using an insole for a man's shoe. A shank element having a resin content of 40 weight % and with 150 g/m² of carbon fibers was produced by impregnating monoaxially oriented carbon fibers, each having a filament diameter of 7μ, with a bisphenol A type epoxy resin as the matrix resin. Then this element was cut to a size of 15 mm in width and 100 mm in length (the lengthwise direction was the same as the orientation direction of the fibers) and put on an insole element comprising leather impregnated with a melamine resin to prepare a one ply laminate and a two ply laminate. Then, a bisphenol A type epoxy resin adhesive with a viscosity of 1 poise was applied thereto so as to impregnate in an amount of 0.02 g/cm² and in an area 1.5 cm wider than the face where the shank was applied. The above described shank element was applied to one side of the insole element for either a 1 ply or 2 ply element or to both sides for either a 1 ply or 2 ply element to prepare 10 preliminary insoles. A nylon cloth was put on them to cover the area where the adhesive had been applied and further a tetrafluoroethylene resin film was put thereon. 10 pieces of thus resulting preliminary insoles were piled up and the assembly was clamped such that the shape of elements was not disturbed. The assembly was heated for 4 hours in a heating furnace at 110° C. to harden and adhere. After cooling, the clamping was removed and the releasing films and nylon cloths were removed. No disturbance of the fibers in the shank part of the insole was observed and a good appearance was obtained.

The strain and destruction load were measured by applying a load to the molded insole reinforced with the carbon fiber-reinforced resin and to a conventional insole reinforced with a steel shank. A 3-point bending method was employed and a strain gauge was used for measuring the strain. The results obtained are shown in Table 3 below.

Table 3

| Sample | Relationship Between Load and Strain (μ strain) | | | Destruction Load (kg) | Weight of Shank (g) |
|---|---|---|---|---|---|
| | 10 kg | 20 kg | 30 kg | | |
| Steel Shank* | 1740 | 4130 | 8100 | 37 | 8.7 |
| Carbon Fiber Reinforced Resin | | | | | |
| One Side 1-ply | 2300 | 6190 | 10500 | 31 | 0.4 |
| One Side 2-ply | 1700 | 4200 | 7700 | 38 | 0.8 |
| Both Sides 1-ply | 1590 | 3670 | 6800 | 40 | 0.8 |
| Both Sides 2-ply | 880 | 1880 | 2470 | — | 1.6 |

*15 mm × 100 mm × 1 mm

These results in Table 3 show that, in the insole reinforced with the 2-ply shank of the present invention, the same characteristics as in the case of using the steel shank were obtained. Additionally improved characteristics are obtained if the number of plies is increased.

While the invention has been described in detail and with reference to specific embodiments thereof, it will be apparent to one skilled in the art that various changes and modifications can be made therein without departing from the spirit and scope thereof.

What is claimed is:

1. An insole having a shank comprising a sheet of a synthetic resin reinforced with fibers wherein said fibers have a specific modulus of elasticity of at least about $6 \times 10^9$ mm and a specific strength of at least about $5 \times 10^7$ mm and comprise carbon fibers or a combination of carbon fibers with glass fibers or aromatic polyamide fibers, wherein said combination comprises at least 10% by volume of carbon fibers, and wherein the volume ratio of said fibers in said synthetic resin is about 30 to about 85% by volume, said shank being put on the insole.

2. The insole as set forth in claim 1, in which said fibers are said carbon fibers.

3. The insole as set forth in claim 1, in which said fibers comprise said combination of carbon fibers with glass fibers or aromatic polyamide fibers.

4. The insole as set forth in claim 1, in which said fibers are in the form of a cloth.

5. The insole as set forth in claim 1, in which said fibers are oriented in one direction.

6. The insole as set forth in claim 5, in which the fibers comprise glass fibers sandwiched between carbon fibers.

7. The insole as set forth in claim 1, in which the insole additionally includes a shank on each side of the insole.

8. The insole as set forth in claim 1, in which the rear-half of the insole including the heel is integrally formed with a synthetic resin reinforced with fibers.

9. The insole as set forth in claim 1, in which the shank element one or more openings and the openings are filled with an adhesive for the shank element and the insole element such that the adhesive passes through the openings.

10. The insoles as set forth in claim 1, in which the insole includes an insole element wherein the insole element is impregnated with an adhesive for the insole element and a shank element in an area wider than the area of the shank.

11. The insole as set forth in claim 1, wherein said carbon fibers are formed from rayon or polyacrylonitrile and have a modulus of elasticity of about $13.7 \times 10^9$ mm and a specific strength of about $171 \times 10^6$ mm.

12. The insole as set forth in claim 1, wherein said volume ratio is 50 to 95% by volume.

13. The insole as set forth in claim 1, wherein said shank has a thickness of more than about 0.14 mm.

14. The insole as set forth in claim 1, wherein said insole has a thickness of about 0.28 to about 0.64 mm.

15. The insole as set forth in claim 1, wherein said fibers have a length of more than about 2 mm.

16. The insole as set forth in claim 15, wherein said fibers have a length of no longer than 10 mm.

17. The insole as set forth in claim 15, wherein said fibers have a length of 2 mm to 150 mm.

18. The insole as set forth in claim 1, wherein said shank is applied to a surface of said insole, which surface is a flat surface extending over the insole which receives said shank in intimate contact therewith over the total area of one surface of the shanke.

19. The insole as set forth in claim 1, wherein said synthetic resin is thermosetting.

20. The insole as set forth in claim 1, wherein said synthetic resin is thermoplastic.

21. The insole as set forth in claim 1, wherein said insole is flat in shape.

* * * * *